United States Patent
Gorshkov et al.

(10) Patent No.: US 10,459,705 B2
(45) Date of Patent: Oct. 29, 2019

(54) LATENCY MEASUREMENT TECHNOLOGY

(71) Applicant: Intel Corporation, Santa Clara, CA (US)

(72) Inventors: Anton V. Gorshkov, Nizhny Novgorod (RU); Michael Berezalsky, Tirat Carmel (IL); Konstantin Levit-Guervich, Kiryat Byalik (IL); Julia Fedorova, Nizhny Novgorod (RU); Noam Itzhaki, Yokneam Elit (IL); Arik Narkis, Kiryat Tivon (IL); Sion Berkowits, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/856,743

(22) Filed: Dec. 28, 2017

(65) Prior Publication Data

US 2019/0042223 A1 Feb. 7, 2019

(51) Int. Cl.
*G06F 8/41* (2018.01)
*G06F 11/34* (2006.01)

(52) U.S. Cl.
CPC .......... *G06F 8/4441* (2013.01); *G06F 8/441* (2013.01); *G06F 11/3466* (2013.01)

(58) Field of Classification Search
CPC ..... G06F 8/4441; G06F 8/441; G06F 11/3466
See application file for complete search history.

(56) References Cited

U.S. PATENT DOCUMENTS

| | | | | |
|---|---|---|---|---|
| 8,001,531 | B1* | 8/2011 | Rideout | G06F 11/3664 709/217 |
| 2007/0226703 | A1* | 9/2007 | Sharapov | G06F 12/0862 717/131 |
| 2010/0180255 | A1* | 7/2010 | Chung | G06F 8/443 717/110 |
| 2011/0126174 | A1* | 5/2011 | Krauss | G06F 11/3466 717/127 |

OTHER PUBLICATIONS

Melanie Kambadur et al., "Fast Computational GPU Design with GT-Pin", 2015 IEEE International Symposium on Workload Characterization, Oct. 2015, 11 pages.
"SASSI Instrumentation Tool for NVIDIA GPUs", github.com/NVlabs/SASSI, retrieved Dec. 27, 2017, 3 pages.
Konstantin Levit-Gurevich et al, U.S. Appl. No. 15/806,917, entitled "Method and Apparatus to Perform Instruction-Level Graphics Processing Unit (GPU) Profiling Based on Binary Instrumentation", filed Nov. 8, 2017, 69 pages.

* cited by examiner

*Primary Examiner* — Wei Y Zhen
*Assistant Examiner* — Amir Soltanzadeh
(74) *Attorney, Agent, or Firm* — Jordan IP Law, LLC

(57) ABSTRACT

Systems, apparatuses and methods may provide for technology that receives compiled code and identifies a plurality of blocks in the compiled code. Instrumented code may be generated from the compiled code by modifying the blocks to include probes to measure latencies of the blocks during execution of the instrumented code on a graphics processing unit.

21 Claims, 13 Drawing Sheets

LATENCY MEASUREMENT TECHNOLOGY

TECHNICAL FIELD

Embodiments generally relate to computing systems. More particularly, embodiments relate to the measurement of instruction latency in computing systems.

BACKGROUND

Computer code or program may be executed on a number of devices. The efficiency of the code may be determined by analyzing where the most time is spent during the program's execution. Such an analysis may be called "instruction hotspot analysis" and is used to identify performance issues in source code by marking code (e.g., highlighting the lines of code), which may take a significant amount of time during execution of the code.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
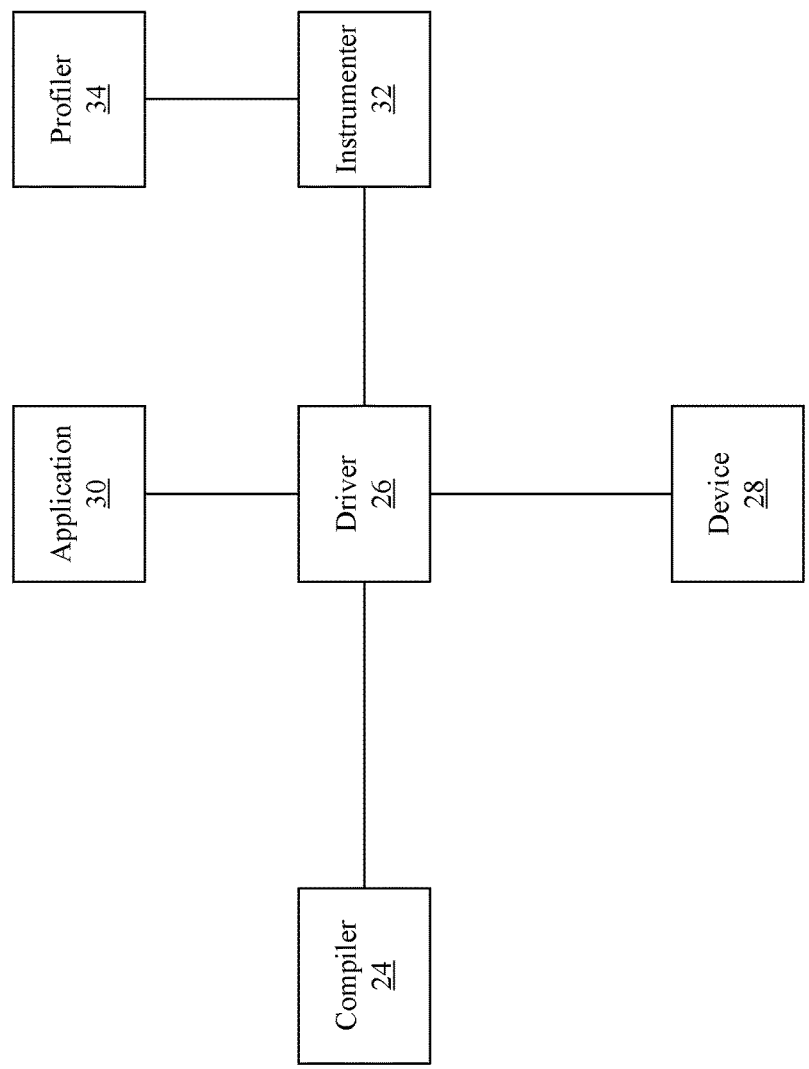
FIG. 1 is an illustration of an example of a latency measurement apparatus according to an embodiment.

FIG. 1 illustrates an exemplary embodiment of a computing architecture 20 that includes a device 28, wherein a user may provide a code or program to be executed by the device 28. The device 28 may be a graphics processor (e.g., graphics processing unit/GPU) with multiple execution units. Instruction hotspot analysis for a GPU may be valuable, but may also be difficult due to significantly different architectures between the GPU and other devices such as, for example, a central processing unit (CPU). For example, a GPU may have enhanced parallel execution units that may execute a plurality of different threads in parallel, and may further have an in-order execution architecture. Based on an instruction hotspot analysis of instructions for the GPU, an application may modify code that is determined to have a high latency, wherein the modification enhances the efficiency of the code.

Some exemplary embodiments of the present application provide technology to enhance reliable GPU instruction latency measurement based on binary instrumentation techniques that determine the "hottest" instructions (i.e., the instructions that execute an operation having a longest latency during execution of the program) as well as hottest lines of source code for the kernels and/or shaders executed on a GPU. The code may be automatically analyzed to identify instruction blocks, wherein the instruction blocks may be prioritized. The instruction blocks may then be automatically instrumented based on the prioritization to insert probes into the instruction blocks.

The instrumented code may be provided to the device 28 for execution. During execution, the probes may gather measurement data (e.g., latency and execution counts) of the instrumented code. The measurement data may be analyzed based on static information of instructions of the code to determine instruction hotspots, and presented to the user for review via, for example, a display. Therefore, a latency measurement is determined for code that may be currently executing, and it may not be necessary to measure the entire kernel/shader. That is, only a part of the code may be instrumented, and furthermore, it may be possible to measure latency for different kernel/shader parameters or parts for different executions and then to merge the results.

An application 30 may provide code to a driver 26 and request that the driver 26 compile the code. The driver 26 may then invoke the compiler 24. While the driver 26 and the compiler 24 are illustrated separately, it may be understood that the driver 26 may include the compiler 24. The input to the compiler 24 may be an original kernel or shader high-level code, and the output from the compiler 24 may be a sequence of bytes containing binary code or an intermediate representation of binary code that has been post-processed, both of which may be referred to as compiled code. The compiled code may be executable by the device 28.

Prior to execution of the compiled code by the device 28, the driver 26 may invoke the instrumenter 32 and provide the compiled code to the instrumenter 32. The instrumenter 32 may instrument the compiled code to generate instrumented code. For example, the instrumenter 32 may communicate with a profiler 34, which may be a profiling application, to execute the instrumentation of the compiled code. A binary instrumentation framework may be employed for instruction level profiling, for example a GT-PIN framework. The profiler 34 may instruct the instrumenter 32 where to instrument the compiled code and how, and then process the profiled data after execution of the instrumented code. The instrumentation may include dividing the compiled code into blocks, in which each block has only one "heavy" instruction as well as only one entry point and one exit point. A heavy instruction may be defined as a dynamic operation, or one in which the time to execute the operation of the heavy instruction (i.e., latency) may be highly variable (e.g., potentially long or short) and unpredictable. In contrast, "light" instructions may execute an operation to have more predictable latencies. Therefore, it may be possible to accurately estimate the latency of light instructions using static analysis, but more difficult to accurately estimate the latency of heavy instructions using static analysis.

Each of the blocks may have a probe assigned to the block. The type of probe may vary depending on a priority of the block. For example, a hardware register based probe may be faster than a memory (e.g., cache or RAM access required) based probe. Therefore, to enhance accuracy, time sensitive blocks and/or blocks in which obtaining an accurate timing is more important, may be referred to as high priority blocks, and may be modified to include hardware register based probes. In contrast, blocks with less time sensitivity and/or blocks that may not be as important as far as instruction hotspot analysis is concerned, may have lower priorities and may be modified to include memory based probes.

The instrumented code may therefore include a plurality of blocks of code, in which each block includes a memory based probe or a register based probe. The instrumented code functionality may be unaltered compared to the compiled code. For example, all of the binary instructions in the compiled code may be retained in the instrumented code, and additionally the instrumented code may include other instructions to collect data and measurements (e.g., the memory or register based probe) for latency analysis.

The instrumented code may be provided to the driver 26. The driver 26 may then provide the instrumented code on the device 28. The device 28 may execute the instrumented code. Profiling data may be generated as the program executes and stored in memory or registers. After the instrumented code completes executing, the profiling data may be maintained in memory. The profiling data may be accessed by the instrumenter 32 that passes the profiling data along to the profiler 34 to be processed, for example to determine instruction latencies of individual instructions from the profiling data. The profiler 34 may be an application that presents the processed data to the user via a display for example. The user may determine instruction hotspots from the processed data.

Figure 2:
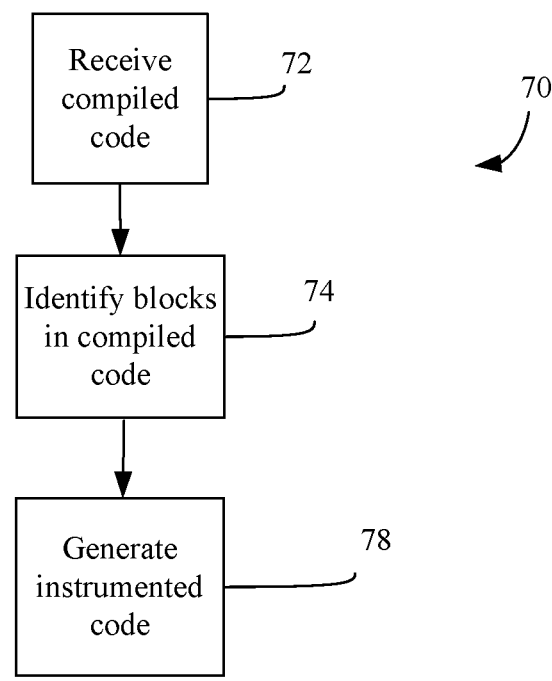
FIG. 2 is a flowchart of an example of a method of instrumenting code according to an embodiment.

FIG. 2 illustrates a method 70 of instrumenting code to identify instruction hotspots. The method 70 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field-programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 70 may be written in any combination of one or more programming languages, including RTL, object oriented programming languages such as JAVA, SMALLTALK, C++, CUDA or the like, and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 72 may receive compiled code. The compiled code may be binary code. Illustrated processing block 74 may identify a plurality of blocks in the compiled code. Illustrated processing block 78 may generate instrumented code from the compiled code. For example, to generate the instrumented code, illustrated processing block 78 may modify the blocks to include probes to measure latencies of the blocks during execution of the instrumented code on the graphics processing unit.

Figure 3:
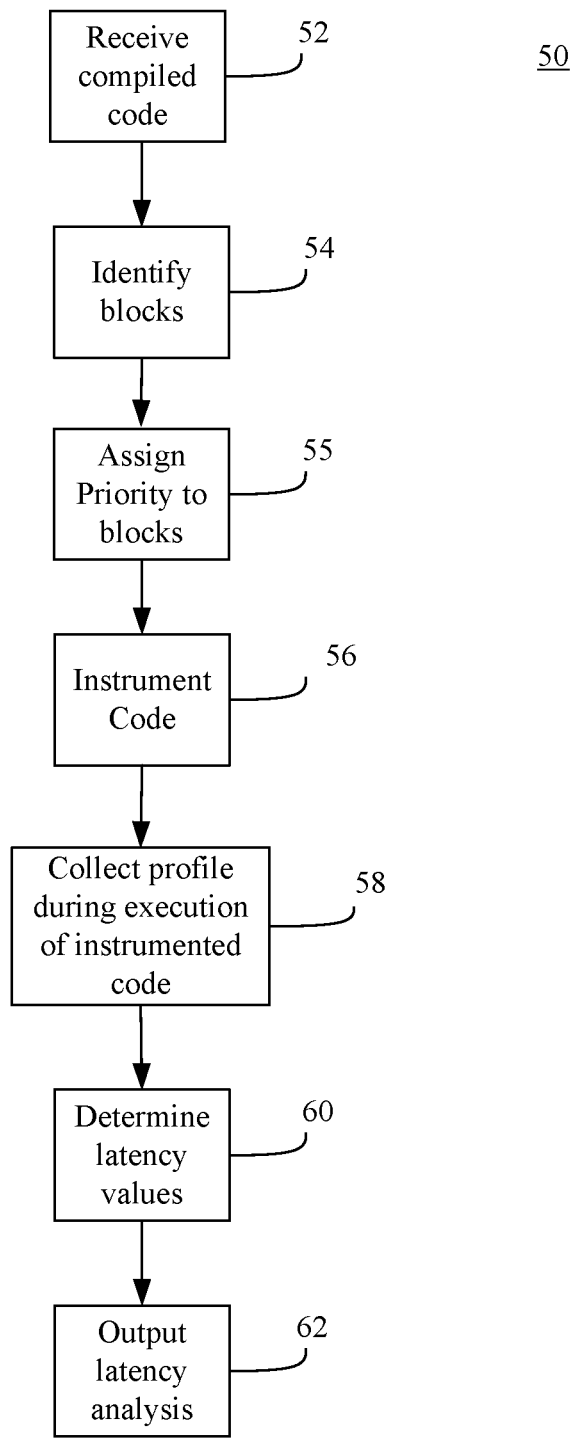
FIG. 3 is a flowchart of an example of a method of measuring latency according to an embodiment.

FIG. 3 illustrates a method 50 to identify instruction hotspots. The method 50 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

In illustrated processing block 52, compiled code may be received. In illustrated processing block 54, instruction blocks within the compiled code may be identified to generate a control flow graph of blocks. As described above, the instruction blocks may each include only one heavy instruction, as well as one exit and one entrance. Thus, instructions may be divided into one of two or more classes, in which a first of the classes includes potentially heavy instructions, and a second of the classes includes light instructions.

Some examples of heavy instructions include barrier (e.g., WAIT) instructions that are associated with synchronization of threads within a group of threads. It may be difficult to predict accurate latencies of barrier instructions, due to scheduling specifics and variances of execution of different threads executing in parallel. For example, a thread that includes the WAIT instruction may need to wait for another thread to finish executing before the WAIT instruction completes execution. Furthermore, it may be difficult to accurately estimate the latencies of data requests associated with data usage of data where the data needs be retrieved. In such a case, the data usage instruction may be considered a heavy instruction since the time needed to access data stored in cache may be far less than the time needed to access data in the RAM thus making the latency of the data usage unpredictable and possibly long, depending on the type of access that is required. Further, if a data usage instruction operation operates on data retrieved by an open data read operation (e.g., a data read operation that is not completed), the data usage instruction operation may have to wait until the data is retrieved before executing. The data usage operation, paired with a relatively proximate and open data request, may therefore be considered a heavy instruction since the timing of the data retrieval may be variable.

Therefore, a heavy instruction may be defined as executing dynamic operation, or one in which the time (i.e., latency) may be highly variable and unpredictable. That is, it may be difficult to accurately predict heavy instructions latency statically.

In contrast, light instructions may execute operations that have predictable static latencies and may have latencies accurately estimated from static models. Some examples of light instructions include simple instructions including asynchronous data reads, ADD and MOV operations with operands not dependent on open data requests.

As an example, a memory read by itself may be lightweight since a request to memory is asynchronous, which may be considered a non-blocking operation. An asynchronous instruction may initiate an operation and allow other instructions to execute prior to the operation completing. For example, the operation initiated by asynchronous instruction may complete after the other instructions are completed. Potentially heavy instruction may be some other instruction that uses data that was previously requested by a data request, in which the data request may be uncompleted prior to the potentially heavy instruction beginning execution. A sample pseudo-code is provided below:

```
(1) send (8|M0) r53:f r126 0xC 0x024060FF        // Data request
(lightweight)
(2) cmp (8|M0) (lt)f0.0 r124.0<1>:f r52.0<8,1>:f 0x0:f   // Data usage
(lightweight)
(3) cmp (8|M0) (lt)f0.1 r122.0<1>:f r53.0<8,1>:f 0x0:f   // Data usage
(potentially heavy)
```

Line 1 may include a data request (i.e., send) instruction, which may be asynchronous. An asynchronous data request may be considered a light instruction since the code does not need to wait for the data to arrive before the execution of line 2 for example. Once the data does arrive, the operation initiated by instruction of line 1 may store the data at register r53 to complete the execution. Line 2 does not include a data request, but instead includes a data usage (i.e., cmp that is a compare command) instruction. Line 3 requires data usage (i.e., cmp command), but further includes a data reference to the data request of line 1 (i.e., register r53:f). This may be potentially heavy, since this depends on the data request of line 1 being completed prior to line 3, and as noted above the data request may be asynchronous and may not be completed prior to execution of line 3.

Thus, to identify the instruction blocks, a static dependency analysis may be implemented in which all wait instructions, such as each data usage paired with a data request that may not be completed prior to the data usage, may be labeled as a heavy instruction. Therefore, the instructions may be analyzed to determine pairs of data usages and data requests, in which each data usage instruction executes on data retrieved by one of the data requests. Other instructions may be labeled as light instructions.

Each instruction block may include a maximal sequence of instructions that may be accurately measured by a single probe, and that includes at most one heavy instruction, although more than one heavy instruction may be included in some embodiments. In some embodiments, if there is more than one heavy instruction in an instruction block, the instruction block may be divided until only one heavy instruction is included in each instruction block.

Once the code has been identified and divided into instruction blocks by illustrated processing block 54 to generate the control flow graph, different priorities may be assigned to the instruction blocks by illustrated processing block 55. For example, a priority may be set for each instruction block. An instruction block associated with a higher priority may have a greater probability of being measured with a register based probe. An instruction block associated with a lower priority may have a lower probability of being measured with a register based probe, and instead may be measured with a memory based probe. Thus, a priority may be considered a metric that corresponds to how much execution of a kernel (as well as overall result accuracy) is disturbed using a memory based probe instead of a register-based probe. A higher number may mean that priority is lower, and therefore a higher disturbance is allowed, whereas a lower number may mean that the priority is higher and a lower disturbance is allowed.

For example, a priority value may be a number from 1 to N, where 1 is the highest priority and N is the lowest priority. N may be any number, and may be equal to a total number of instruction blocks in the kernel and/or shader.

Instruction blocks that contain data request and data usage, and/or that are between data request and data usage for a pair of instruction blocks may be assigned priorities based on the following parameters. Each instruction block that contains a data request (e.g., asynchronous data request) without usage of the data retrieved by the data request may have the highest priority of "1" so that latency may be accurately measured. Storing of the measured latency occurs inside the instrumentation code, and minimizing the overlapping time for completing the data request and the time for the instrumentation code (e.g., the probe) may be a factor in assigning priorities. Furthermore, execution of a probe in an instruction block may increase the execution time of the instruction block, relative to when the instruction block does not include a probe. Maintaining the increase in execution time of the instruction block to be below a certain percentage or factor may also be a consideration when assigning priorities.

For example, a memory based probe may execute over a significant amount of time that may overlap with the time for completing execution of the user's data request. This may lead to data inaccuracy of measuring latency of an instruction that requires the data associated with the data request. Thus, if a memory based probe is inserted into a data request instruction block that does not include a corresponding data usage, the time required for execution of the memory based probe may mask some of the time needed to complete the operation initiated by the data request instruction and data waiting by an operation of another instruction in a different instruction block, which may lead to inaccurate results For example, initiating an operation by the data request instruction may have a predictable and lower latency, which a probe may measure. Completing the operation initiated by the data request may take longer and finish after the probe has executed. The data request may lead to data waiting by an operation of another instruction (which may be in a different instruction block than the data request) that requires the data retrieved by the data request. To accurately measure the latency of the another instruction, minimizing the execution time of the probe at certain instruction blocks may enhance analysis to avoid masking the time needed to complete the data request. That is, careful placement of the probes may enhance a determination of the latency of an instruction that requires the data retrieved by the data request.

Therefore, a data request block that does not include data usage of the retrieved data, may use a register based probe by being assigned the highest priority. Further, each instruction block following the instruction block with the opened data request has an increased probability of obtaining previously requested data, so it may be possible to decrease the priority for such instruction blocks relative to data request instruction blocks, for example to "K," but still allow the instruction blocks a high probability of being measured with a register based probe.

If an instruction block has a priority equal to "K," then the next instruction block may have a priority that is "K+1" if the block does not contain any data request paired with a data usage from another block. If the next instruction block contains data usage paired with a data request, then the next instruction block may be assigned "K+2." For example, data usage (due to data waiting in some cases), may take more time than computational code, so the priority decreases for such instruction blocks. That is, a memory based probe may be less likely to significantly skew the latency analysis since such instruction blocks execute over a longer time frame. As such, a memory based probe may increase the execution time of the instruction block by an acceptable percentage. If the next instruction block contains the last data usage for a set of previously opened data requests (there will be no more opened data requests after this instruction block), the instruction block may be assigned "N." All other instruction blocks may have an N priority, if there are no any open data requests for the instruction blocks.

Illustrated processing block 56 may instrument the code to generate instrumented code including register based probes and/or memory based probes. An example of instrumented code is provided below:

```
1.    T1 = READ-TIME-STAMP-COUNTER( ) // read the time in the beginning
2.    mov (8|M0)  r124.0<1>:f  0x3F800000:f
3.    mov (8|M0)  r125.0<1>:f  0x3F800000:f
4.    mov (8|M0)  r126.0<1>:f  0x0:f
5.    mov (8|M0)  r127.0<1>:f  0x3F800000:f
6.    T2 = READ-TIME-STAMP-COUNTER( ) // read the time in the end
7.    LATENCY_DELTA = T2−T1        // compute the delta
8.    INCREMENT-IN-MEMORY-OR-REGISTER(LATENCY_DELTA)    // accumulate the latency results in memory or registers
9.    INCREMENT-IN-MEMORY-OR-REGISTER(EXECUTION_COUNTER)   // increment the instruction block execution counter in memory or registers
```

Lines 1 and 6-9 may be the probe, while lines 2-5 may be an instruction block of code from the compiled code. In line 1, the time T1 before the execution of the instruction block of code is read. The code then executes in lines 2-5. In line 6, the time T2 at the end of the execution of the instruction block is read. In line 7, the latency is calculated by subtracting the time T1 from the time T2. A memory counter or register counter may be incremented at line 8 to reflect the difference between T2-T1. For example, the difference between T2 and T1 may be added to a time value already stored in the memory counter or register counter. The time value may reflect a total amount of time the code has executed, across all iterations of the code. An instruction block execution counter of the memory or register counter may be incremented at line 9 to increment the instruction block execution count. The code may then reiterate from line 1, if it is so programmed (e.g., an iterative program such as a "for loop"). Thus, for the above, two values may be collected per probe: 1) instruction block duration (latency) at line 8, and 2) instruction block execution count (how many times this instruction block was executed) at line 9.

A timestamp reading operation may be lightweight for a GPU and may not disturb the execution unit pipeline. Thus, a timestamp reading operation as in lines 1 and 6 may have almost zero timing influence into a normal execution for a kernel and/or a shader.

As described in lines 8-9, two types of probes (memory and register) may be used. Only one of the probes may be used in the code. To save per-block latency, the instrumentation code of the probes (lines 6-9) is added directly after the measured instruction block (lines 2-5). The memory and register probes are described below.

The memory probe stores measured result into memory. The number of such probes may be essentially unlimited, but it may cause a significant overhead as described above, and as a result, some data inaccuracy may occur (e.g., lines 8-9 may take significant time to execute which may skew the latency analysis).

A register probe may temporarily store a measured result into a free hardware register and move it into memory only after the kernel and/or shader finished. The register probe may be a lightweight probe (e.g., lines 8-9 are lightweight when a register probe is utilized). The number of available register probes may be limited by the number of available free registers on execution for a particular kernel and/or shader. If possible, each instruction block of code may include a register probe. In many instances, the number of instruction blocks to be measured may exceed the number of available register probes, particularly with respect to kernels and/or shaders.

As such, an enhancement of some embodiments is a careful employment of register based probes to place the register based probes where the register based probes may be needed the most in order to obtain reliable latency values. For example, the distribution of register based probes and memory based probes may be based on the priorities assigned by illustrated processing block 54. Higher priority instruction blocks may be assigned the register based probes. When all of the register based probes have been assigned, the memory based probes may be assigned to the remainder of the instruction blocks that may have lower priorities than the higher priority instruction blocks. That is, since there may be a limited amount of register based probes due to hardware configurations, the register based probes are assigned to the higher priority instruction blocks to enhance operation and reduce latency inaccuracies during data collection.

After the code has been instrumented, illustrated processing block 58 may collect profiling data during execution of the instrumented code. For example, the instrumented code may be executed by the GPU. Illustrated processing block 58 may store the latency values (e.g., the execution count and the latency time for each instruction block) in memory and registers using the probes. After the execution, illustrated processing block 60 may determine instruction latency values from the latency values stored by illustrated processing block 58 by combining static and dynamic information. In some embodiments, illustrated processing block 60 may determine final latency times (i.e., the instruction latency values) for each operation initiated by instructions of the instruction blocks from the latency values.

The instruction latency values may be output by illustrated processing block 62 to a display for example. A specialized graphical user interface may display the latency values.

Figure 4A:
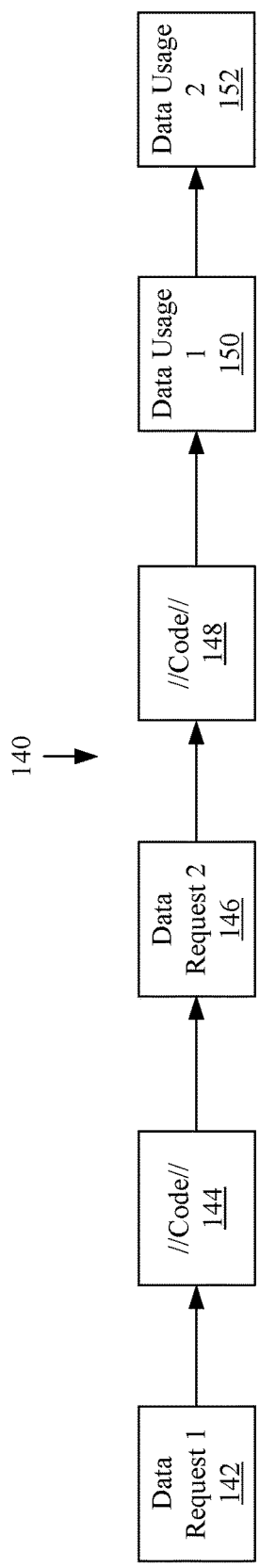
FIGS. 4A and 4B are illustrations of control flow graphs according to embodiments.
Figure 4B:
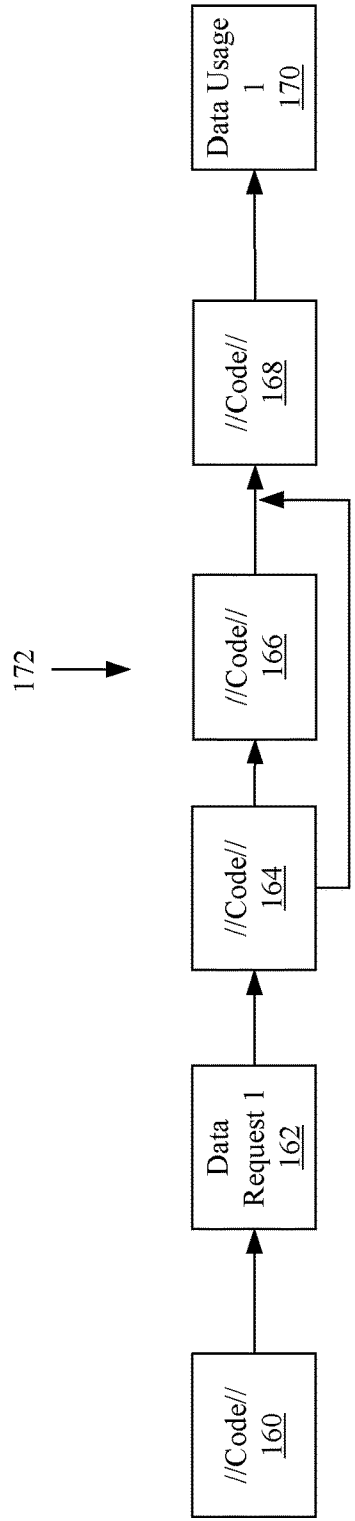

FIGS. 4A and 4B illustrate exemplary embodiments of control flow graphs (CFGs) 140, 172, respectively, representing user code that is divided into blocks. The CFGs 140, 172 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

CFGs 140, 172 may be compiled code that has been divided into instruction blocks. The CFGs 140, 172 may be based on different user codes. Furthermore, the user codes of CFGs 140, 172 may be programmed for execution on a specific device, for example a GPU.

In CFG 140 of FIG. 4A, instruction blocks 142-152 are illustrated. Instruction block 142 may be paired with instruction block 150 in that the data associated with the data request 1 of instruction block 142 may be utilized by data usage 1 of instruction block 150. Instruction block 146 may be paired with instruction block 152 in that the data associated with the data request 2 of instruction block 146 may be utilized by data usage 2 of block instruction 152.

The instruction blocks 142-152 may be assigned priorities. As described above, the priorities correspond to a probability that a register based probe will be assigned to the instruction blocks. Controlling the priorities therefore allows control over which instruction blocks are to be assigned register based probes and may enhance latency measurement.

Placement of the register based probes at specific instruction blocks may reduce the probability of an inaccurate latency measurement being generated. For example, the instruction blocks may correspond to a kernel and/or shader. If the placement of a memory probe significantly increases the timing of an instruction block (e.g., increases the timing for execution of the instruction block by several times), the kernel execution may be disturbed and an inaccurate instruction hotspot analysis may be generated. As such, register based probes may be placed to so that a percentage increase in latency of an instruction block remains below a predetermined amount.

For example, insertion of a probe may be limited to increase the overall execution time of an instruction block to 5% or less. Therefore, some instruction blocks may be assigned priorities to be instrumented by register based probes that are faster than memory based probes. Moreover, a GPU may be a parallel system, and the same code may be run in parallel on several execution units. To obtain a more accurate understanding of the latency, correctly identifying certain memory requests may provide an enhanced understanding of the longer latency memory requests. Thus, memory requests may be measured using a register based probe to enhance accuracy.

When assigning priorities, each instruction block that includes a data request, but does not include data usage, may have the highest priority to increase the probability that a register based probe is assigned to the instruction block to avoid an intersection between two different data requests. For example, the memory based probe may include a data request (e.g., a read operation). As such, if a memory based probe was included in instruction block 142, instruction block 142 would include two memory requests: 1) data request 1 of the compiled user code of instruction block 142, and 2) the memory based probe memory request inserted by the latency measurement apparatus. As described above, this may lead to inaccurate results and increase the latency of the instruction block 142 by a detrimental margin.

Thus, instruction block 142 includes a data request 1 with no data usage, and instruction block 146 includes a data request 2 with no data usage. So, in the exemplary embodiment of FIG. 4A, instruction blocks 142, 146 should be assigned high priorities, such as "1." By assigning a high priority, it is likely that instruction blocks 142, 146 may be assigned a register based probe rather than a memory based probe.

Instruction blocks that execute directly after instruction blocks with memory requests may be assigned relatively high priorities, but lower than that of the blocks with memory requests. For example, instruction blocks that execute after instruction blocks having data requests with no data usage of the data request, have an increased probability of operating on data that has already arrived in cache memory or registers for example, and therefore may have a reduced latency compared to an instruction block that must retrieve data from a hard drive and then use the data. While, an additional data request (i.e., via a memory probe) may not disturb the instruction blocks, it may nonetheless enhance operation to include a register based probe due to the possible reduced latency and avoid increasing the overall execution time of the instruction block to a detrimental amount. Moreover, data requests may still be open (i.e., not yet completed), so a register based probe may be ideally utilized to enhance accuracy.

Therefore, a higher priority is assigned to instruction blocks that directly follow data requests. For example, if an instruction block (e.g., a data request instruction block) has a priority equal to "K," then the next instruction block may have a priority that is "K+1" if the instruction block does not contain any data usage paired with a data request from another instruction block. If the next instruction block contains data usage, then the next instruction block may be assigned "K+2." For example, instruction blocks 144, 148 directly follow instruction blocks 142, 146. Instruction blocks 144, 148 may not include a data access or data usage. Instruction blocks 144, 148 may be assigned relatively high priorities due to their proximity to data requests 1, 2 of instruction blocks 142, 146, but lower priorities than instruction blocks 142, 146 so that the instruction blocks 144, 148 are likely to have register based probes assignments. For example, the instruction blocks 144, 148 may be assigned priorities of "2." Therefore, since both instruction blocks 144, 148 may have an increased probability of obtaining previously requested data and are proximate instruction blocks 142, 146, instruction blocks 144, 148 have the $2^{nd}$ level of priority to be measured with register based probes. Furthermore, even if these instruction blocks are assigned memory based probes due to the $2^{nd}$ priority level, the impact to the result accuracy will be less than assigning memory based probes to blocks 142, 146 with data requests 1, 2.

Instruction block 150 may execute first data usage 1 based on the data requested by data request 1 of instruction block 142. Instruction block 150 may be assigned the $3^{rd}$ level of priority since according to the CFG 140, the instruction block 150 is the second instruction block from instruction block 146 which is a data request. That is, the priority of instruction block 150 may be the priority of instruction block 146 (i.e., $1^{st}$), incremented by two. Furthermore, instruction block 150 may have a higher latency due to data waiting for the data usage 1, and therefore a memory probe may increase the overall latency of instruction block 150 by an acceptable percentage (e.g., less than 5%). Thus, it is likely that a memory based probe will be assigned to instruction block 150 due to the lower priority assigned to instruction block 150. The memory based probe may minimally affect accuracy since there may be an open data request (e.g., data request 1). In some embodiments, instruction block 150 may be assigned a 4$^{th}$ level priority rather than 3$^{rd}$ level priority since the data usage 1 may have a higher latency and a memory based probe may be unlikely to significantly skew the latency results of following instruction block 152.

Instruction block 152 may execute data usage 2 based on the data requested by data request 2 of instruction block 146. Instruction block 152 may execute last in the CFG 140, and as such all other data requests and data usages may be completed. Therefore, instruction block 152 may be assigned a memory probe since the latency caused by the memory probe may not affect latency measurements since after instruction block 152, all pairs of data requests 1, 2, and data usage 1, 2, are closed. Thus, instruction block 152 may be assigned a priority of N, and is likely to have a memory based probe assigned thereto.

In some embodiments, the CFG 140 may include instruction blocks following instruction block 152. Instruction blocks following instruction block 152 may be assigned a priority of N until a data request instruction block is detected, at which time the priorities may be set similar to above.

FIG. 4B illustrates a CFG 172. The CFG 172 includes instruction blocks 160-170. Data request 1 of instruction block 162 is paired with data usage 1 of instruction block 170. That is, the data usage 1 may execute based on the data request 1 and therefore may need to wait until data usage 1 has completed. Instruction block 160 may be assigned a priority of N, since instruction block 160 does not include a data usage or data request, and precedes the data request 1 of instruction block 162. Instruction block 162 includes data request 1 and is therefore assigned a high priority, such as priority 1, to be modified to include a register based probe. Instruction block 164 does not include a data request or data usage, and executes directly after instruction block 162 and so instruction block 164 may be assigned a priority of 2. After instruction block 164 either instruction block 166 or instruction block 168 executes. Both instruction blocks are assigned priorities of 3, since they neither have data requests paired with data usage, and either instruction block may execute directly after instruction block 164. Instruction block 170 may be assigned priority N since block 170 executes last and has no data priority.

Figure 5:
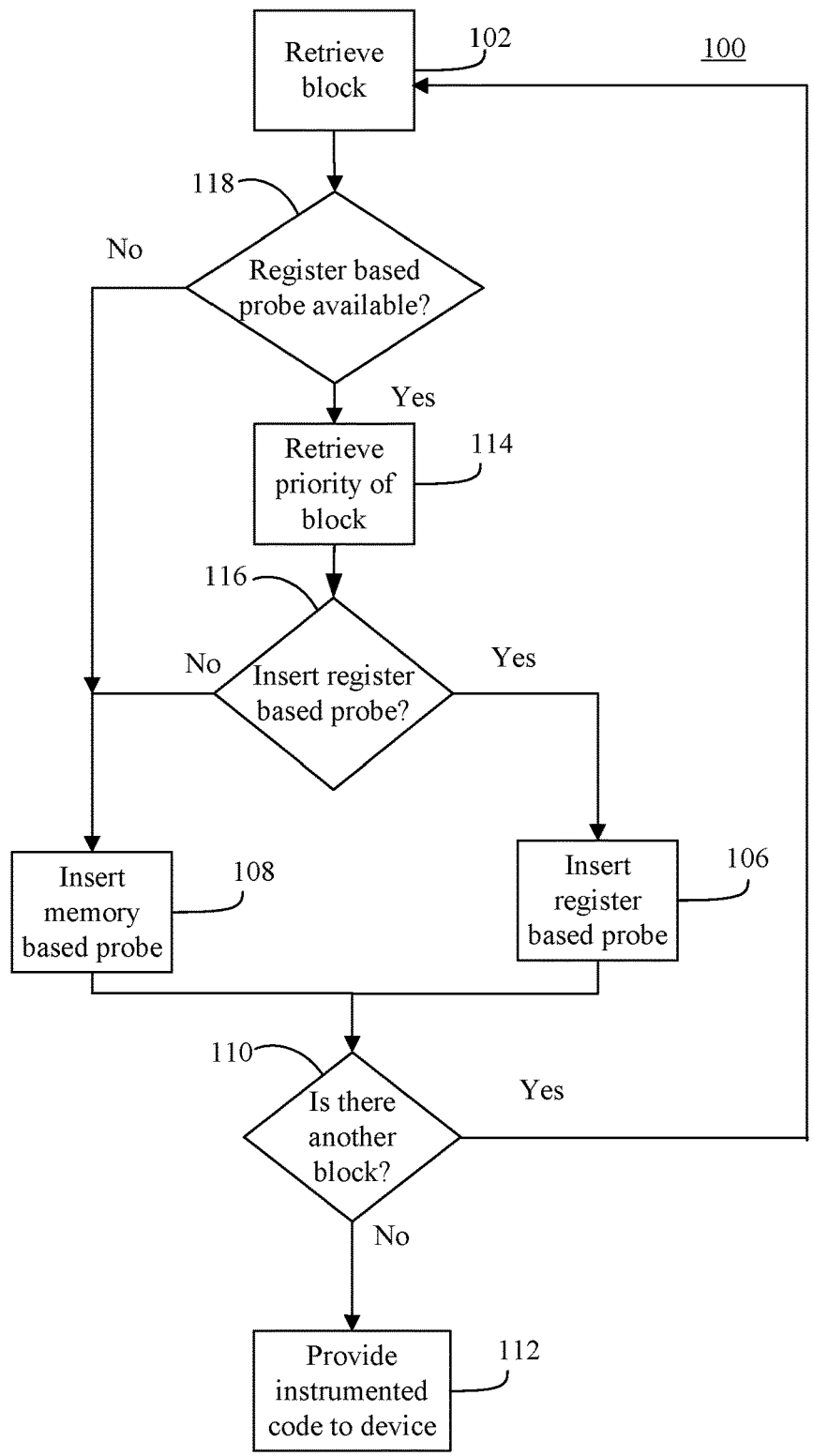
FIGS. 5-6 are flowcharts of examples of methods of modifying code according to embodiments.

FIG. 5 illustrates a method 100 of instrumenting user code. The method 100 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. In the exemplary embodiment illustrated, a compiled user code may have already been divided into instruction blocks and assigned priorities as described above.

In illustrated processing block 102 an instruction block of the compiled user code may be retrieved. The blocks may be retrieved in a descending order of their priorities. Illustrated processing block 118, may determine whether any register based probes are available. Register based probes may be unavailable if there are no hardware registers available on the device that will execute the instrumented user code. For example, if each of the registers of a GPU, which is to execute the instrumented user code, is to be used to execute aspects of the code and probes, then no available registers may remain. If no register based probes are available, then a memory based probe may be inserted into the instruction block by illustrated processing block 108.

If illustrated processing block 118 determines that register based probes are available, then a priority of the instruction block may be determined by illustrated processing block 114. The priority may have been assigned as described above. Illustrated processing block 116 may determine whether to insert a register based probe. For example, illustrated processing block 116 may consider whether the priority of the instruction block is above a threshold, and/or is greater than the priorities of other remaining instruction blocks. If the priority of the instruction block is above the threshold and/or greater than the priorities of the other remaining instruction blocks, illustrated processing block 106 may instrument the code to include a register based probe. If not, illustrated processing block 108 instruments the instruction blocks to include a memory based probe. Illustrated processing block 110 then determines if there is another instruction block to be instrumented. If so, illustrated processing block 102 retrieves another instruction block. Otherwise, the instrumented code may be provided to a device by illustrated processing block 112.

Figure 6:
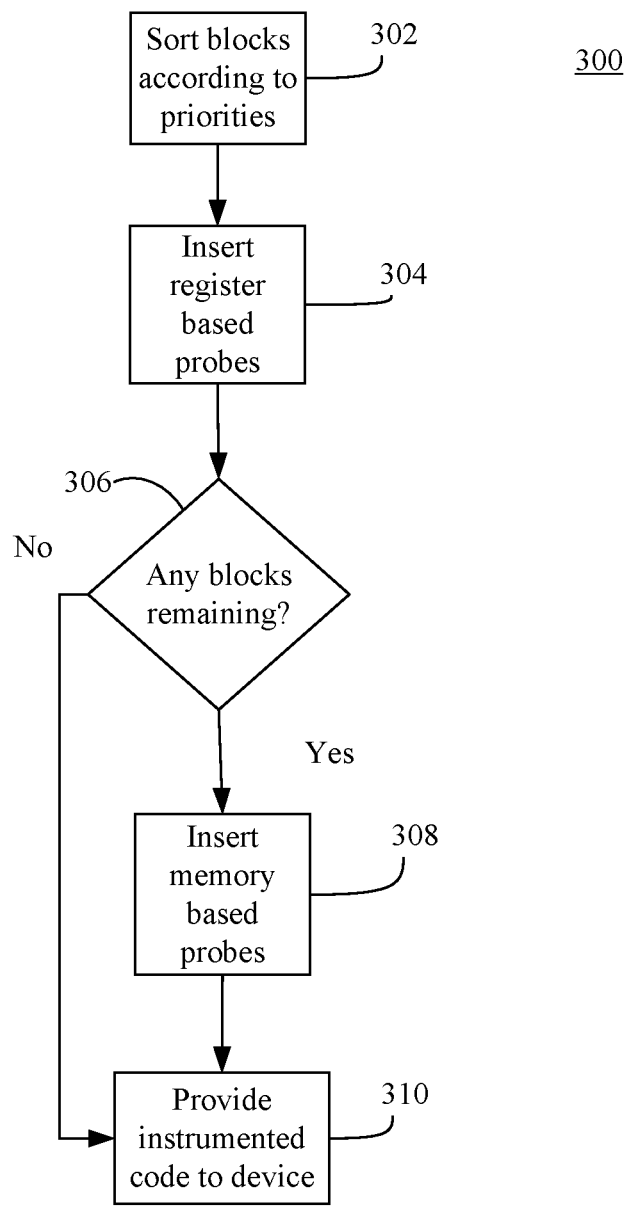

FIG. 6 illustrates a method 300 of instrumenting user code. The method 300 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

In the exemplary embodiment, a compiled user code may have already been divided into instruction blocks and assigned priorities as described above. Illustrated processing block 302 may sort the instruction blocks according to priority. While the relative position of the blocks may remain unchanged in the compiled user code, illustrated processing block 302 may generate a data structure (e.g., an array or lookup table) storing the association between the instruction blocks and the priorities, and that is sorted based on priority. For example, the data structure may be sorted so that instruction blocks associated with higher priorities are first in order.

Illustrated processing block 304 may insert register based probes into the instruction blocks with the highest priorities. For example, illustrated processing block 304 may access the data structure, determine which instruction blocks have the highest priorities and instrument register based probes into those instruction blocks until register based probes are all allotted or all the instruction blocks are instrumented. Illustrated processing block 306 may determine whether any instruction blocks are remaining and are not instrumented. If so, illustrated processing block 308 may insert memory based probes into the remaining instruction blocks. Otherwise, or after illustrated processing block 308 executes, illustrated processing block 310 may provide the instrumented code to the device (e.g., GPU) for execution of the code (e.g., runtime of the code).

Figure 7:
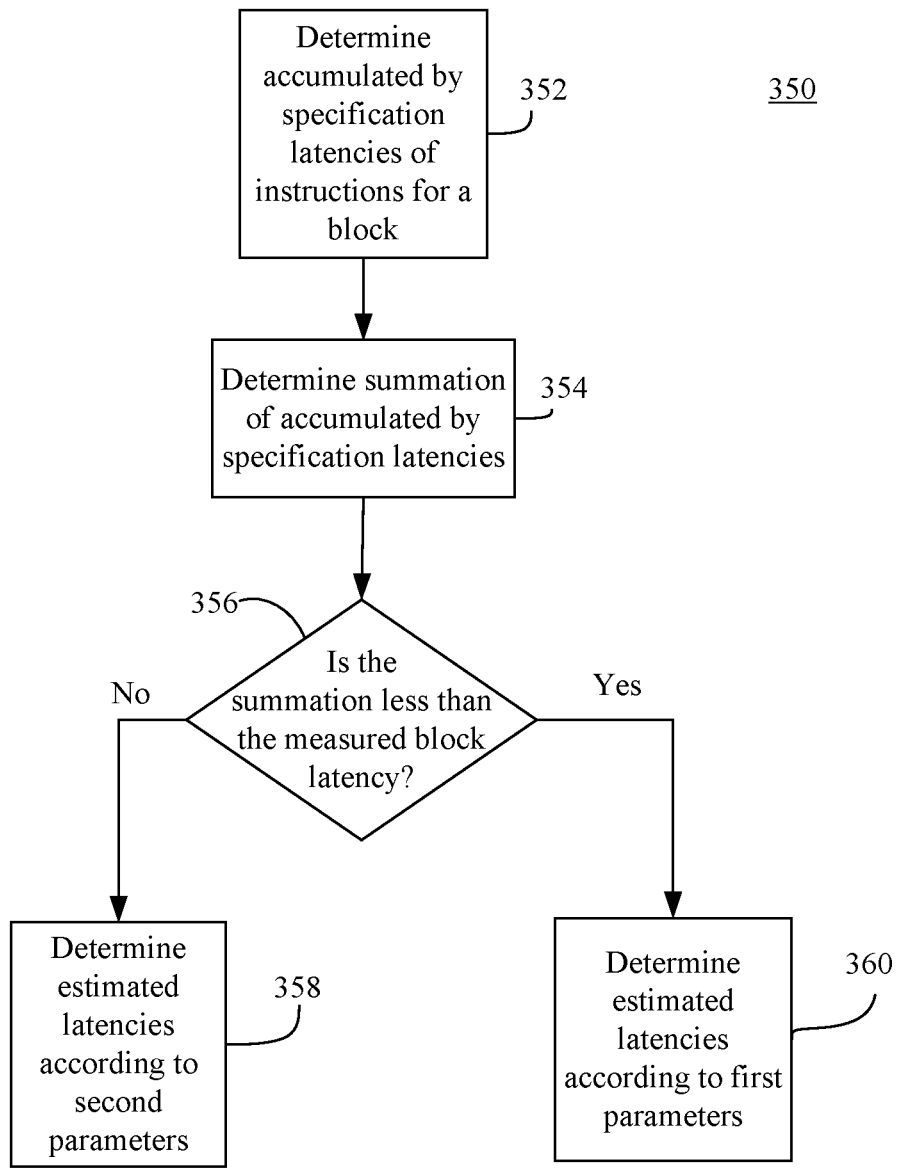
FIG. 7 is a flowchart of an example of a method of determining latency according to an embodiment.

FIG. 7 illustrates a method 350 of post-processing data obtained by the probes during execution of instrumented code. The method 350 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. Post-processing may include determining latency values for each instruction for a kernel and/or shader. For example, after a code runs on a GPU there will be two values for each instruction block: instruction block latency and instruction block execution count. Method 350 may determine a latency value for each instruction inside a particular instruction block. Method 350 may operate on each instruction block in turn to determine the latency of each instruction in the instrumented code.

Illustrated processing block 352 may determine the by specification latencies of instructions for an instruction block. The by specification latencies may be the time needed to complete operations initiated by the instructions. For example, it may be possible to assume a minimal instruction latency $W_{min}$ is 4 cycles. Such a value may be obtained from a GPU performance simulator in cycle-accurate mode for example. It may further be possible to assume latencies for different instruction execution sizes. For example, a number of vector lanes in hardware required by execution of an instruction may determine the size of the instruction. The sizes of instructions may range from 1 to 16 for example. For different instruction sizes, the minimal instruction latency may be modified. For example, instructions having execution sizes 1, 2 and 4 may be equal to each other, and have by specification instruction latencies equal to $W_{min}$. For an instruction having an execution size 8, the by specification instruction latency may be equal to $2*W_{min}$. For an instruction having an execution size 16, the by specification instruction latency may be equal to $4*W_{min}$.

Some instructions may have set values regardless of execution size. For example, a MATH instruction (irrespective of its execution size) may have a by specification instruction latency that is equal to $8*W_{min}$. Such latencies described above may be referred to as "by-specification latencies" as they are estimated based on predetermined values. Illustrated processing block 352 may determine for every instruction in the instruction block, the accumulated by-specification latency (ASL) $W_i$ for that particular instruction as follows:

$W_i$=(by specification latency for instruction)*(instruction block execution count)  Equation 1

The instruction block execution count (how many times the instruction block executes) may be counted by the probe of the instruction block during execution of the instruction block. ASL $W_i$ may be different for different instructions in the same instruction block since the by specification latency will vary depending on the particular instruction.

Illustrated processing block 354 may determine a summation $S_{all}$ that is a sum of all the accumulated by specification latencies for the instructions. For example, illustrated processing block 354 may sum the instruction 1 ASL $W_i$, instruction 2 ASL $W_i$, . . . , instruction n ASL $W_i$ for the instructions of the instruction block.

Illustrated processing block 356 may determine if the summation $S_{all}$ is less than the measured block latency. As described above, the measured block latency (which may be referred to as instruction block latency or accumulated latency) may be measured by the probe of the instruction block during execution of the instruction block. For example, the probe may determine the total time latency of the instruction block during execution of the instruction block. Illustrated processing block 356 may therefore be used to determine if the ASL $W_i$ for lightweight instructions are approximately accurate. For example, if the summation $S_{all}$ is less than the measured block latency, then the ASL $W_i$ for lightweight instructions may be determined to be nearly accurate. In contrast, if the summation $S_{all}$ is greater than the measured block latency, it is probable that the ASL $W_i$ are not accurate. Thus, different sets of first and second parameters may be used to determine a latency of a heavy instruction based on whether the ASL $W_i$ are nearly accurate.

If the summation $S_{all}$ is less than the measured block latency, illustrated processing block 360 may determine the latencies according to the first parameters. For example, the final estimated latency for each lightweight instruction may be the ASL $W_i$ for that particular instruction as determined above. A sum $S_1$ of all lightweight instructions' ASL $W_i$ may be determined. The ASL $W_i$ of the heavy instruction may not be included in the sum $S_1$. The dynamic latency for a heavy instruction of the instruction block may be determined by:

Dynamic latency of heavy instruction=measured block latency−sum $S_1$  Equation 2

Thus, each of the lightweight instructions may have latencies set to the ASL $W_i$ value calculated above, while in contrast the heavy instruction may have a different estimated latency from the ASL $W_i$ for the heavy instruction that is determined above.

If in illustrated processing block 356 the summation $S_{all}$ is not less than the measured block latency, then the latencies are determined according to second parameters by illustrated processing block 358. That is, each instruction may have a latency determined by:

final latency=ASL $W_i$*(measured block latency)/$S_{all}$.  Equation 3

As noted above, the ASL $W_i$ may be different for each instruction to generate different final latencies for the instructions. Thus, it may be possible to estimate dynamic instruction latency. While not illustrated, the latencies may be output to a profiler for example to be further analyzed and displayed to a user. For example, debug information may be presented to a user, and the debug information may aggregate individual instruction latencies to a corresponding source line of a kernel/shader to identify the hot spots.

An example of a latency distribution is provided in the following data structure:

TABLE I

| Instruction Line | | Static Latency | Dynamic Latency | Execution Count |
|---|---|---|---|---|
| N/A | Instruction Block | 6,800 | 20,000 | 100 |
| 1 | send (8\|M0) r53:f r126 0xC 0x024060FF | 800 | 800 | 100 |
| 2 | cmp (4\|M0) (lt)f0.0 r124.0<1>:f r52.0<8;8,1>:f 0x0:f | 400 | 400 | 100 |
| 3 | cmp (8\|M0) (lt)f0.1 r122.0<1>:f r53.0<8;8,1>:f 0x0:f | 800 | 14,000 | 100 |
| 4 | math.fdiv (8\|M0) r66.0<1>:f r66.0<8;8,1>:f 0x40400000:f | 3200 | 3,200 | 100 |
| 5 | mov (16\|M0) r127.0<1>:f 0x3F800000:f | 1600 | 1,600 | 100 |

The above table may be a data structure, such as a table or lookup array. Each of instructions 1, 2, 4 and 5 are considered to be lightweight instructions with by specification instruction latencies of 8, 4, 32 and 16 respectively. Instruction 3 may be a heavy instruction with a by specification instruction latency of 8. Since the execution count is 100, the ASL $W_i$ of instructions 1, 2, 3, 4 and 5 may be 800, 400, 800, 3,200 and 1,600. Instructions 1, 2, 4 and 5 may be lightweight since they do not require a data access from a previous instruction. In contrast, instruction 3 requires a data access from instruction 1 (i.e., the r53). Thus, since instruction 3 may effectively have a wait function since it must wait for data from instruction 1 (which may be an asynchronous operation). Thus, instruction 3 may be a heavy instruction.

The measured block latency as calculated by the probe is 20,000. The total accumulated by specification latency values $W_i$ may be calculated for instructions 1, 2, 3, 4 and 5. A total summed value $S_{all}$ of these instructions is 6,800 (i.e., ASL $W_i$ of instructions 1, 2, 3, 4 and 5 summed together). $S_{all}$ in this example is less than 20,000. Since $S_{all}$ is less than 20,000, the first parameters may be utilized as described above to determine the final latencies. Thus, the latencies of the first, second, fourth and fifth lines of code may be estimated to be the ASL $W_i$ value for that instruction, that was calculated as described above. The third line of code may be the measured instruction block latency (i.e., 20,000) minus the total summed value 6,000 which is 14,000. Thus, the latency of line 3 is equal to 14,000.

In some embodiments, an instruction block may not include a heavy instruction. In such a case, the instruction latencies may be calculated based according to the second parameters above and in accordance with Equation 3. The time needed to complete an operation initiated by an instruction may be referred to as the latency of the instruction.

Figure 8:
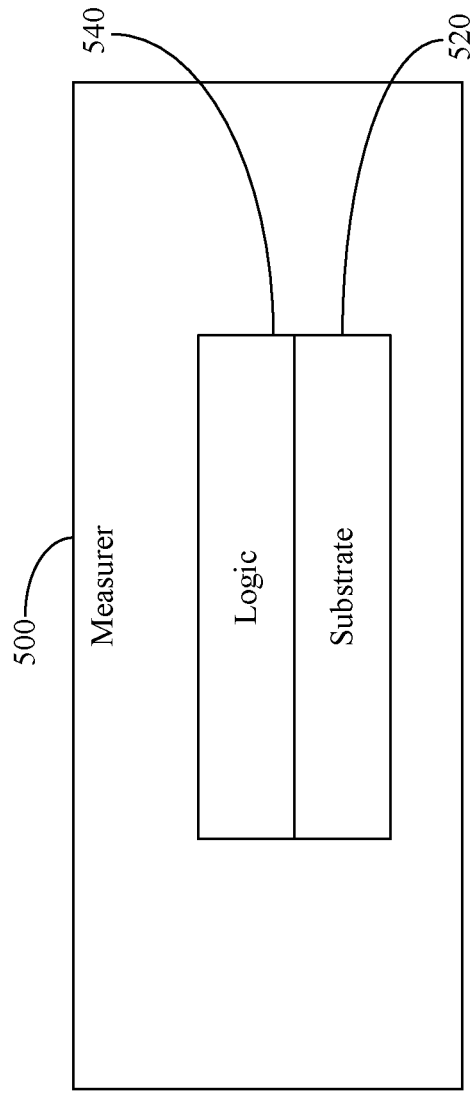
FIG. 8 is an illustration of an example of a measurer according to an embodiment.

FIG. 8 shows a semiconductor package apparatus 500. The apparatus 500 may implement one or more aspects of the methods 70, 50, 100, 300, 350 (FIGS. 2, 3, 5, 6, and 7, respectively) and may be readily substituted for the profiler 34 and instrumenter 32 (FIG. 1). The illustrated apparatus 500 includes one or more substrates 520 (e.g., silicon, sapphire, gallium arsenide) and logic 540 (e.g., transistor array and other integrated circuit/IC components) coupled to the substrate(s) 520. The logic 540 may be implemented at least partly in configurable logic or fixed-functionality logic hardware. In one example, the logic 540 includes transistor channel regions that are positioned (e.g., embedded) within the substrate(s) 520. Thus, the interface between the logic 540 and the substrate(s) 520 may not be an abrupt junction. The logic 540 may also be considered to include an epitaxial layer that is grown on an initial wafer of the substrate(s) 520.

Figure 9:
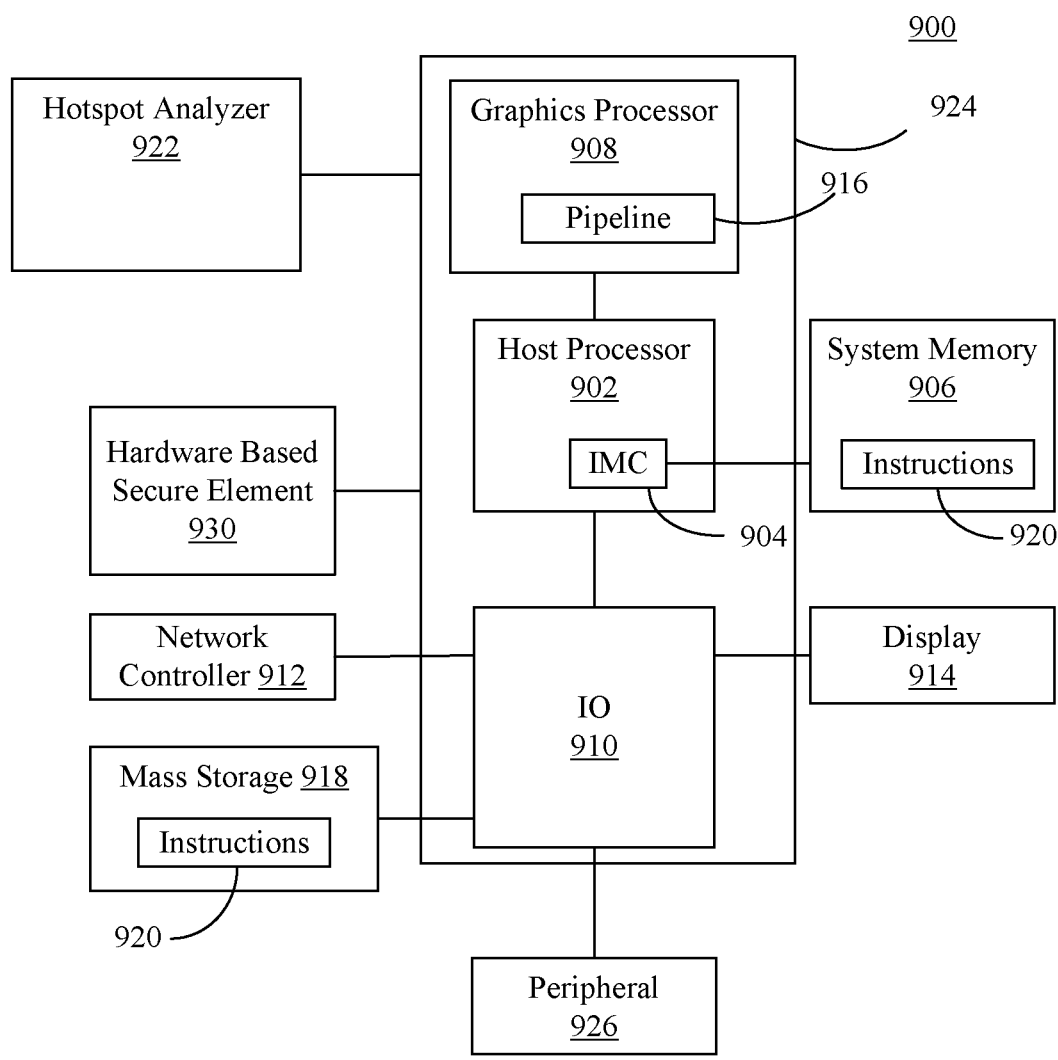
FIG. 9 illustrates an example of an enhanced instruction hotspot analyzer system according to an embodiment.

FIG. 9 illustrates a latency detection enhanced computing system 900. The illustrated system 900 includes a system on chip (SoC) 924 having a host processor (e.g., central processing unit/CPU) 902, a graphics processor 908 (e.g., graphics processing unit/GPU) and an input/output (IO) module 910. In the illustrated example, the host processor 902 includes an integrated memory controller (IMC) 904 that communicates with a system memory 906 (e.g., DRAM).

The host processor 902 may be coupled to the graphics processor 908, which may include a graphics pipeline 916, and the IO module 910. The IO module 910 may be coupled to a network controller 912 (e.g., wireless and/or wired), a display 914 (e.g., fixed or head mounted liquid crystal display/LCD, light emitting diode/LED display, etc., to visually present a video of a 3D scene) and mass storage 918 (e.g., flash memory, optical disk, solid state drive/SSD).

The illustrated system 900 includes an instruction hotspot analyzer 922, which may operate and include features as described herein, and may implement one or more aspects of the methods 70, 50, 100, 300, 350 (FIGS. 2, 3, 5, 6, and 7, respectively) and may be readily substituted for the profiler 34 and instrumenter 32 (FIG. 1). The hotspot analyzer 922 may be connected to the SoC 924. The hotspot analyzer 922 may communicate with the graphics processor 908 to determine hotspots in a user code as described herein. The hotspot analyzer 922 may visually present a hotspot analysis instruction latencies) of the user's code on the display 914.

In some embodiments, the hotspot analyzer 922 may be part of the SoC 924. In some embodiments, the system memory 906 and/or the mass storage 918 may include instructions 920, which when executed by the host processor 902 and/or the graphics processor 908, cause the system 900 to perform one or more aspects of the methods 70, 50, 100, 300, 350 (FIGS. 2, 3, 5, 6, and 7) and may be readily substituted for the profiler 34 and instrumenter 32 (FIG. 1). In some embodiments, parts of the hotspot analyzer 922 may be implemented by the SoC 924, while other parts of the hotspot analyzer 922 are implemented by the system memory 906 and/or the mass storage 918.

Figure 10:
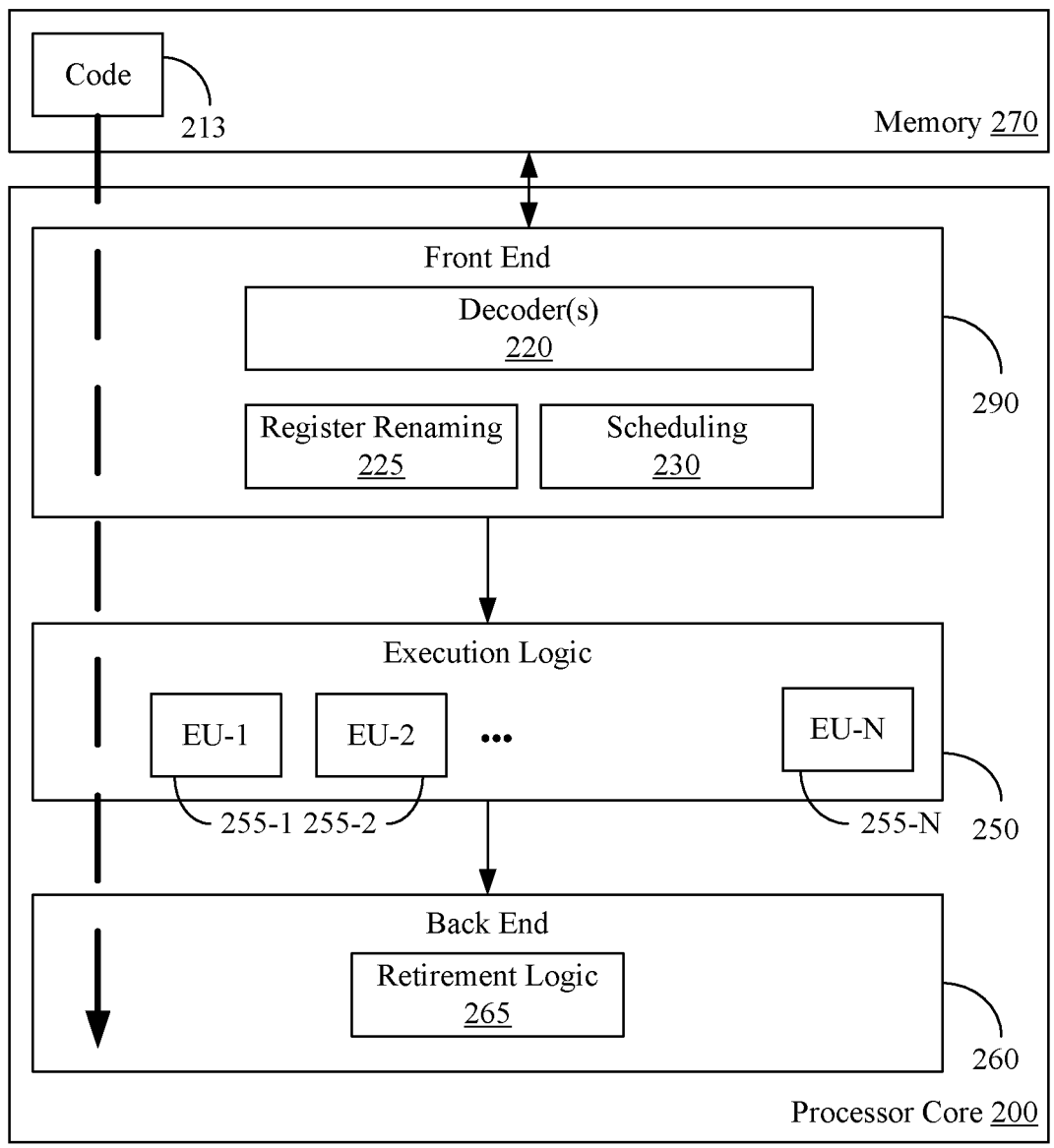
FIG. 10 illustrates an example of a processor core according to an embodiment.

FIG. 10 illustrates a processor core 200 according to an embodiment. The processor core 200 may be the core for any type of processor, such as a micro-processor, an embedded processor, a digital signal processor (DSP), a network processor, or other device to execute code. Although only one processor core 200 is illustrated in FIG. 10, a processing element may alternatively include more than one of the processor core 200 illustrated in FIG. 10. The processor core 200 may be a single-threaded core or, for at least one embodiment, the processor core 200 may be multithreaded in that it may include more than one hardware thread context (or "logical processor") per core.

FIG. 10 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the methods 70, 50, 100, 300, 350 (FIGS. 2, 3, 5, 6, and 7) and may be readily substituted for the profiler 34 and instrumenter 32 (FIG. 1), already discussed. For example, the code 213 may execute the logic of the instrumenter 32 and/or profiler 34, illustrated in for example FIG. 1, and/or the methods 70, 50, 100, 300, 350 (FIGS. 2, 3, 5, 6, and 7). So for example, the processor core 200 may compile a user code, instrument the user code and/or determine instruction latency values. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 10, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 11:
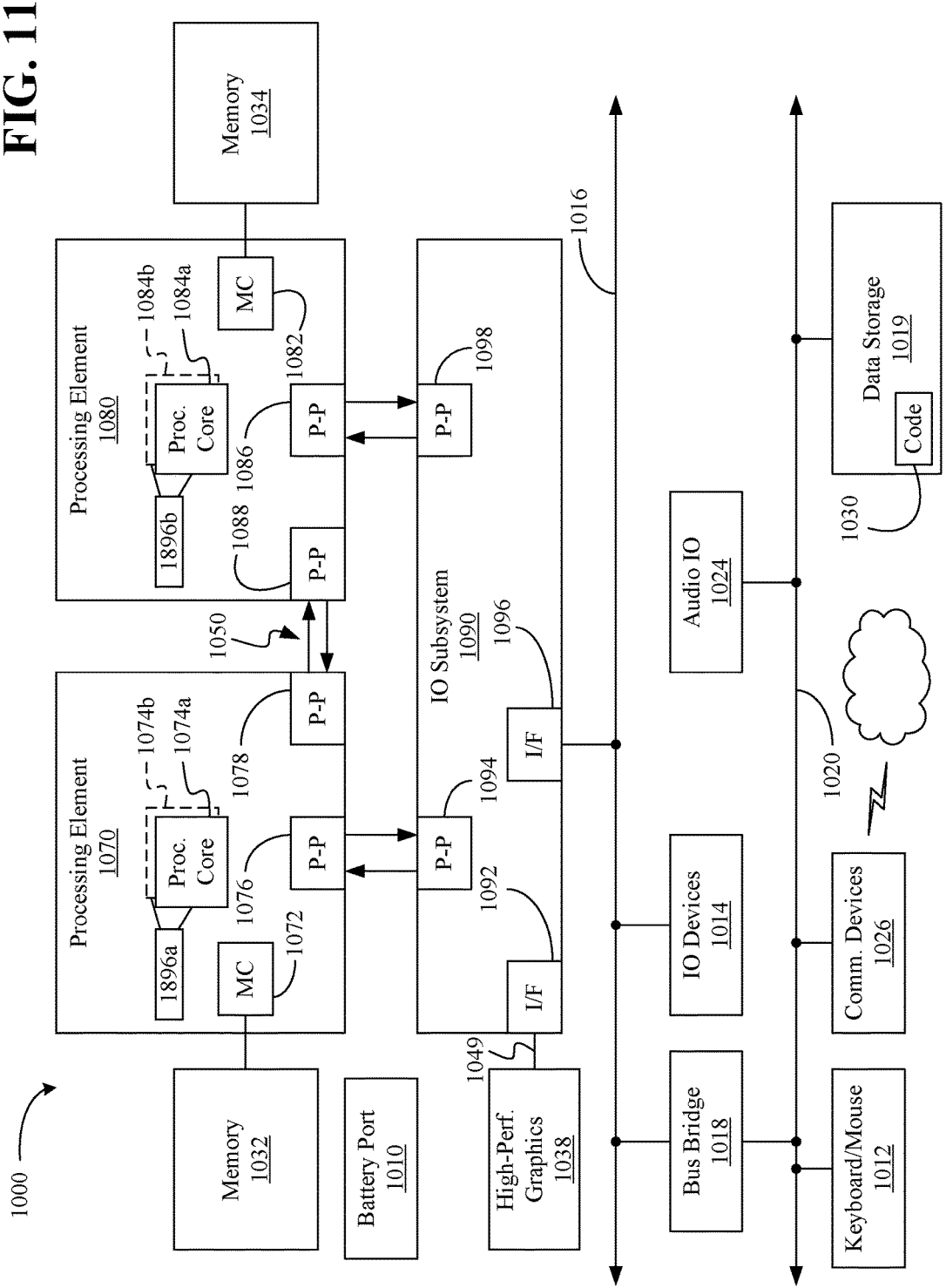
FIG. 11 illustrates a block diagram of a computing system according to an embodiment.

Referring now to FIG. 11, shown is a block diagram of a computing system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 10.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 11 various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030, which may be similar to the code 213 (FIG. 10), may implement one or more aspects of the methods 70, 50, 100, 300, 350 (FIGS. 2, 3, 5, 6, and 7) and may be readily substituted for the profiler 34 and instrumenter 32 (FIG. 1), may further be implemented by one or more of the processing elements 1070 and 1080. Further, an audio I/O 1024 may be coupled to second bus 1020 and a battery port 1010 may supply power to the computing system 1000.

Figure 12:
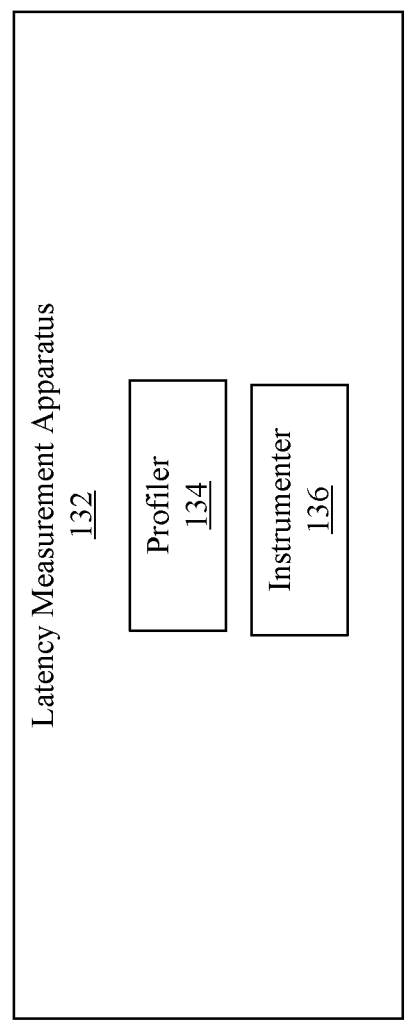
FIG. 12 illustrates a latency measurement apparatus according to an embodiment.

FIG. 12 shows a latency measurement apparatus 132 (134-136) that may implement one or more aspects of the methods 70, 50, 100, 300, 350 (FIGS. 2, 3, 5, 6, and 7, respectively) and may be readily substituted for the profiler 34 and instrumenter 32 (FIG. 1). The latency measurement apparatus 132, may include logic instructions, configurable logic, fixed-functionality hardware logic, etc, or any combination thereof. The instrumenter 136 and the profiler 134 may identify blocks in user code, prioritize the blocks and insert probes into the blocks based on the priorities. The instrumenter 136 and the profiler 134 may further determine latency values of the instructions in the blocks based on latency measurements of the probes during execution of the user code, and furthermore provide the user with the latency values.

Figure 13:
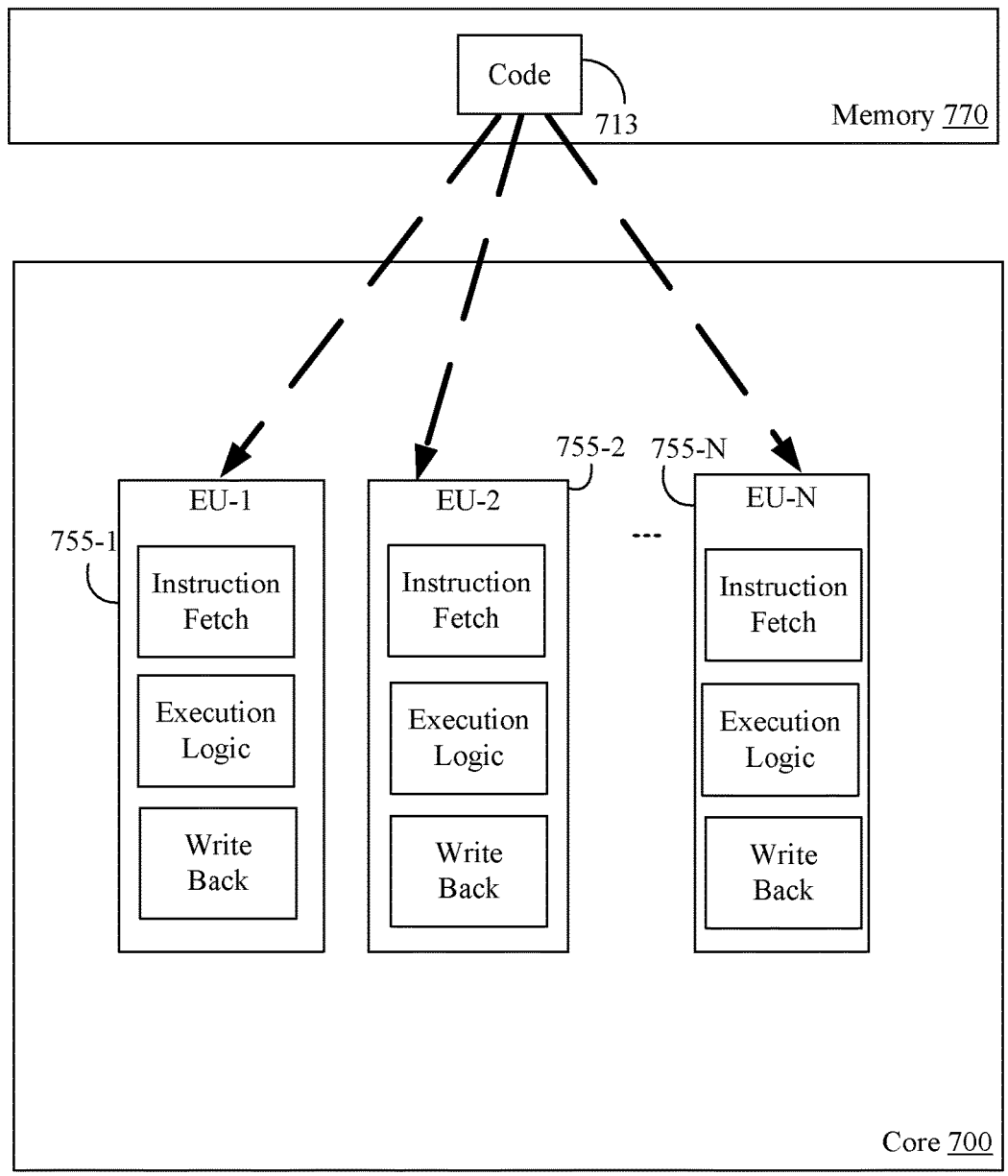
FIG. 13 illustrates an example of a processor core according to an embodiment.

FIG. 13 illustrates a core 700 according to an embodiment. The core 700 may be the core for any type of processor, such as a micro-processor, an embedded processor, a digital signal processor (DSP), a network processor, GPU or other device to execute code, for example instrumented code as described above. Although only one core 700 is illustrated in FIG. 13, a processing element may alternatively include more than one of the core 700 illustrated in FIG. 13. The core 700 may also be a GPU processor that executes instrumented code as described above.

FIG. 13 also illustrates a memory 770 coupled to the core 700. The memory 770 may be any of a wide variety of memories (including various layers of memory hierarchy) as are known or otherwise available to those of skill in the art. The memory 770 may include one or more code 713 instruction(s) to be executed by the core 700, wherein the code 713 may implement one or more aspects of the methods 70, 50, 100, 300, 350 (FIGS. 2, 3, 5, 6, and 7) and may be readily substituted for the profiler 34 and instrumenter 32 (FIG. 1), already discussed. For example, the code 713 may execute the logic of the instrumenter 32 and/or profiler 34, illustrated in for example FIG. 1, and/or the methods 70, 50, 100, 300, 350 (FIGS. 2, 3, 5, 6, and 7). The core 700 follows a program sequence of instructions indicated by the code 713.

The core 700 is shown including execution units 755-1 through 755-N. Some embodiments may include a number of execution units 755-1 to 755-N that may be elementary processor cores. Other embodiments may include only one execution unit or one execution unit that can perform a particular function. The illustrated execution units 755-1 to 755-N performs the operations specified by code instructions 713.

The execution units 755-1 to 755-N may be capable in-order cores with instruction fetch, but may further execute statically scheduled instructions. While a plurality of execution units 755-1 to 755-N are illustrated, only one execution unit may be provided.

Although not illustrated in FIG. 13, a processing element may include other elements on chip with the core 700. For example, a processing element may include memory control logic along with the core 700. The processing element may include I/O control logic and/or may include I/O control logic integrated with memory control logic. The processing element may also include one or more caches.

Additional Notes and Examples

Example 1 may include an enhanced computing system comprising a display, a graphics processor, a host processor, and a memory including a set of instructions, which when executed by one or more of the graphics processor or the host processor, cause the computing system to receive compiled code, identify a plurality of blocks in the compiled code, generate instrumented code from the compiled code, wherein to generate the instrumented code, the blocks are to be modified to include probes to measure latencies of the blocks during execution of the instrumented code on the graphics processor, provide the instrumented code to the graphics processor, determine instruction latencies from profiling data generated by the instrumented code, and visually present the instruction latencies on the display.

Example 2 may include the system of example 1, wherein the instructions, which when executed by the one or more of the graphics processor or the host processor, cause the computing system to assign a respective priority to each of the blocks based on whether the block has a data usage that is dependent on an open data access, and wherein to generate the instrumented code, the instructions, which when executed by the one or more of the graphics processor or the host processor, cause the computing system to modify each of the blocks, based on the respective priority assigned to the block, to include a register based probe of the probes or a memory based probe of the probes.

Example 3 may include the system of example 2, wherein to modify each of the blocks, the instructions, which when executed by the one or more of the graphics processor or the host processor, cause the computing system to include the register based probe in the block when the respective priority assigned to the block is greater than or equal to one or more other priorities of the priorities, and include the memory based probe in the block when the respective priority of the block is less than the one or more other priorities.

Example 4 may include the system of example 1, wherein to determine the instruction latencies, the instructions, which when executed by the one or more of the graphics processor or the host processor, cause the computing system to determine, with the probes, the profiling data to include a latency of each of the blocks during execution of the instrumented code by the graphics processor.

Example 5 may include the system of example 1, wherein the instructions, which when executed by the one or more of the graphics processor or the host processor, cause the computing system to determine, with one of the probes, the profiling data to include an accumulated latency of one of the blocks during execution of the instrumented code by the graphics processor, and wherein to determine the instruction latencies, the instructions, which when executed by the one or more of the graphics processor or the host processor, cause the computing system to determine a static latency value for each of a plurality of instructions of the one block, and determine a dynamic latency value for a heavy instruction of the instructions of the one block, wherein when a total sum of the static latency values is less than the accumulated latency, the dynamic latency value is to be determined based on the accumulated latency and each of the static latency values except the static latency value of the heavy instruction, and when the total sum of the static latency values is greater than or equal to the accumulated latency, the dynamic latency value is to be determined based on the accumulated latency and each of the static latency values.

Example 6 may include the system of any one of examples 1-5, wherein the compiled code is to be binary code or an intermediate representation of binary code.

Example 7 may include a latency measurement apparatus comprising one or more substrates, and logic coupled to the one or more substrates and implemented at least partly in one or more of configurable logic or fixed-functionality logic hardware, the logic to receive compiled code, identify a plurality of blocks in the compiled code, and generate instrumented code from the compiled code, wherein to generate the instrumented code, the logic is to modify the blocks to include probes to measure latencies of the blocks during execution of the instrumented code on a graphics processor.

Example 8 may include the apparatus of example 7, wherein the logic is to assign a respective priority to each of the blocks based on whether the block has a data usage that is dependent on an open data access, wherein to generate the instrumented code, the logic is to modify each of the blocks, based on the respective priority assigned to the block, to include a register based probe of the probes or a memory based probe of the probes.

Example 9 may include the apparatus of example 8, wherein to modify each of the blocks, the logic is to include the register based probe in the block when the respective priority assigned to the block is greater than or equal to one or more other priorities of the priorities, and include the memory based probe in the block when the respective priority of the block is less than the one or more other priorities.

Example 10 may include the apparatus of example 7, wherein the logic is to determine, with the probes, a latency of each of the blocks during execution of the instrumented code by the graphics processor.

Example 11 may include the apparatus of example 7, wherein the logic is to determine a static latency value for each of a plurality of instructions of one of the blocks, determine, with one of the probes, an accumulated latency of the one block during execution of the instrumented code by the graphics processor, and determine a dynamic latency value for a heavy instruction of the instructions of the one block, wherein when a total sum of the static latency values is less than the accumulated latency, the logic is to determine the dynamic latency value based on the accumulated latency and each of the static latency values except the static latency value of the heavy instruction, and wherein when the total sum of the static latency values is greater than or equal to the accumulated latency, the logic is to determine the dynamic latency value based on the accumulated latency and each of the static latency values.

Example 12 may include the apparatus of any one of examples 7-11, wherein the compiled code is binary code or an intermediate representation of binary code.

Example 13 may include the apparatus of any one of examples 7-11, wherein the logic coupled to the one or more substrates includes transistor channel regions that are positioned within the one or more substrates.

Example 14 may include a method of identifying code hotspots, comprising receiving compiled code, identifying a plurality of blocks in the compiled code, and generating instrumented code from the compiled code by modifying the blocks to include probes to measure latencies of the blocks during execution of the instrumented code on a graphics processor.

Example 15 may include the method of example 14, further comprising assigning a respective priority to each of the blocks based on whether the block has a data usage that is dependent on an open data access, wherein the generating the instrumented code includes modifying each of the blocks, based on the respective priority assigned to the block, to include a register based probe of the probes or a memory based probe of the probes.

Example 16 may include the method of example 15, wherein modifying each of the blocks includes modifying the block to include the register based probe when the respective priority assigned to the block is greater than or equal to one or more other priorities of the priorities, and modifying the block to include the memory based probe when the respective priority of the block is less than the one or more other priorities.

Example 17 may include the method of example 14, further comprising determining, with the probes, a latency of each of the blocks during execution of the instrumented code by the graphics processor.

Example 18 may include the method of example 14, further comprising determining a static latency value for each of a plurality of instructions of one of the blocks, determining, with one of the probes, an accumulated latency of the one block during execution of the instrumented code by the graphics processor, and determining a dynamic latency value for a heavy instruction of the instructions of the one block, wherein when a total sum of the static latency values is less than the accumulated latency, the dynamic latency value is determined based on the accumulated latency and each of the static latency values except the static latency value of the heavy instruction, and wherein when the total sum of the static latency values is greater than or equal to the accumulated latency, the dynamic latency value is determined based on the accumulated latency and each of the static latency values.

Example 19 may include the method of any one of examples 14-18, wherein the compiled code is binary code or an intermediate representation of binary code.

Example 20 may include at least one non-transitory computer readable storage medium comprising a set of instructions, which when executed, cause a computing system to receive compiled code, identify a plurality of blocks in the compiled code, and generate instrumented code from the compiled code, wherein to generate the instrumented code, the blocks are to be modified to include probes to measure latencies of the blocks during execution of the instrumented code on a graphics processor.

Example 21 may include the at least one non-transitory computer readable storage medium of example 20, wherein the instructions, when executed, cause the computing system to assign a respective priority to each of the blocks based on whether the block has a data usage that is dependent on an open data access, and wherein to generate the instrumented code, the set of instructions, which when executed, cause the computing system to modify each of the blocks, based on the respective priority assigned to the block, to include a register based probe of the probes or a memory based probe of the probes.

Example 22 may include the at least one non-transitory computer readable storage medium of example 21, wherein to modify each of the blocks of the compiled code, the set of instructions, which when executed, cause the computing system to modify the block to include the register based probe when the respective priority of the block is greater than or equal to one or more other priorities of the priorities, and modify the block to include the memory based probe when the respective priority of the block is less than the one or more other priorities.

Example 23 may include the at least one non-transitory computer readable storage medium of example 20, wherein the instructions, when executed, cause the computing system to determine, with the probes, a latency of each of the blocks during execution of the instrumented code by the graphics processor.

Example 24 may include the at least one non-transitory computer readable storage medium of example 20, wherein the instructions, when executed, cause the computing system to determine a static latency value for each of a plurality of instructions of one of the blocks, determine, with one of the probes, an accumulated latency of the one block during execution of the instrumented code by the graphics processor, and determine a dynamic latency value for a heavy instruction of the instructions of the one block, wherein when a total sum of the static latency values is less than the accumulated latency, the dynamic latency value is to be determined based on the accumulated latency and each of the static latency values except the static latency value of the heavy instruction, and wherein when the total sum of the static latency values is greater than or equal to the accumulated latency, the dynamic latency value is to be determined based on the accumulated latency and each of the static latency values.

Example 25 may include the at least one non-transitory computer readable storage medium of any one of examples 20-24, wherein the compiled code is to be binary code or an intermediate representation of binary code.

Example 26 may include a latency measurement apparatus, comprising means for receiving compiled code, means for identifying a plurality of blocks in the compiled code, and means for generating instrumented code from the compiled code by modifying the blocks to include probes to measure latencies of the blocks during execution of the instrumented code on a graphics processor.

Example 27 may include the apparatus of example 26, further comprising means for assigning a respective priority to each of the blocks based on whether the block has a data usage that is dependent on an open data access, and wherein the means for generating the instrumented code includes means for modifying each of the blocks, based on the respective priority assigned to the block, to include a register based probe of the probes or a memory based probe of the probes.

Example 28 may include the apparatus of example 27, wherein the means for modifying each of the blocks includes means for modifying the block to include the register based probe when the respective priority assigned to the block is greater than or equal to one or more other priorities of the priorities, and means for modifying the block to include the memory based probe when the respective priority of the block is less than the one or more other priorities.

Example 29 may include the apparatus of example 26, further comprising means for determining a latency of each of the blocks during execution of the instrumented code by the graphics processor.

Example 30 may include the apparatus of example 26, further comprising means for determining a static latency value for each of a plurality of instructions of one of the blocks, means for determining, with one of the probes, an accumulated latency of the one block during execution of the instrumented code by the graphics processor, and means for determining a dynamic latency value for a heavy instruction of the instructions of the one block, wherein when a total sum of the static latency values is less than the accumulated latency, the dynamic latency value is determined based on the accumulated latency and each of the static latency values except the static latency value of the heavy instruction, and wherein when the total sum of the static latency values is greater than or equal to the accumulated latency, the dynamic latency value is determined based on the accumulated latency and each of the static latency values.

Example 31 may include the apparatus of any one of examples 26-30, wherein the compiled code is binary code or an intermediate representation of binary code.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent on the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a display;
a graphics processor;
a host processor; and
a memory including a set of instructions, which when executed by one or more of the graphics processor or the host processor, cause the computing system to:
receive compiled code;
identify a plurality of blocks in the compiled code;
assign a respective priority to each respective block of the blocks based on whether the respective block has a data usage that is dependent on an open data access;
generate instrumented code from the compiled code by a modification of each respective block of the plurality of blocks, based on the respective priority assigned to the respective block, to include a register based probe or a memory based probe to measure a latency of the respective block during execution of the instrumented code on the graphics processor;
provide the instrumented code to the graphics processor;
determine instruction latencies from profiling data generated by the instrumented code; and
display the instruction latencies on the display.

2. The system of claim 1, wherein to modify each respective block of the blocks, the instructions, which when executed by the one or more of the graphics processor or the host processor, cause the computing system to include:
the register based probe in the respective block when the respective priority assigned to the respective block is greater than or equal to one or more other priorities of the priorities, and
the memory based probe in the respective block when the respective priority of the respective block is less than the one or more other priorities.

3. The system of claim 1, wherein to determine the instruction latencies, the instructions, which when executed by the one or more of the graphics processor or the host processor, cause the computing system to determine the profiling data to include a latency of each of the blocks during execution of the instrumented code by the graphics processor.

4. The system of claim 1, wherein the instructions, which when executed by the one or more of the graphics processor or the host processor, cause the computing system to determine, with the register or memory based probe of one block of the plurality of blocks, the profiling data to include an accumulated latency of the one block during execution of the instrumented code by the graphics processor; and
wherein to determine the instruction latencies, the instructions, which when executed by the one or more of the graphics processor or the host processor, cause the computing system to:
determine a static latency value for each of a plurality of instructions of the one block; and
determine a dynamic latency value for a heavy instruction of the instructions of the one block, wherein
when a total sum of the static latency values is less than the accumulated latency, the dynamic latency value is to be determined based on the accumulated latency and each of the static latency values except the static latency value of the heavy instruction, and
when the total sum of the static latency values is greater than or equal to the accumulated latency, the dynamic latency value is to be determined based on the accumulated latency and each of the static latency values.

5. The system of claim 1, wherein the compiled code is to be binary code or an intermediate representation of binary code.

6. An apparatus comprising:
one or more substrates; and
logic coupled to the one or more substrates and implemented at least partly in one or more of configurable logic or fixed-functionality logic hardware, the logic to:
receive compiled code;
identify a plurality of blocks in the compiled code;
assign a respective priority to each respective block of the blocks based on whether the respective block has a data usage that is dependent on an open data access;
generate instrumented code from the compiled code by a modification of each respective block of the plurality of blocks, based on the respective priority assigned to the respective block, to include a register based probe or a memory based probe to measure a latency of the respective block during execution of the instrumented code on a graphics processor;
provide the instrumented code to the graphics processor;
determine instruction latencies from profiling data generated by the instrumented code; and
output the instruction latencies to be presented on a display.

7. The apparatus of claim 6, wherein to modify each respective block of the blocks, the logic is to include
the register based probe in the respective block when the respective priority assigned to the respective block is greater than or equal to one or more other priorities of the priorities, and
the memory based probe in the respective block when the respective priority of the respective block is less than the one or more other priorities.

8. The apparatus of claim 6, wherein the logic is to determine a latency of each of the blocks during execution of the instrumented code by the graphics processor.

9. The apparatus of claim 6, wherein the logic is to:
determine a static latency value for each of a plurality of instructions of one block of the blocks;
determine, with the register or memory based probe of the one block, an accumulated latency of the one block during execution of the instrumented code by the graphics processor; and
determine a dynamic latency value for a heavy instruction of the instructions of the one block, wherein
when a total sum of the static latency values is less than the accumulated latency, the logic is to determine the dynamic latency value based on the accumulated latency and each of the static latency values except the static latency value of the heavy instruction, and
when the total sum of the static latency values is greater than or equal to the accumulated latency, the logic is to determine the dynamic latency value based on the accumulated latency and each of the static latency values.

10. The apparatus of claim 6, wherein the compiled code is binary code or an intermediate representation of binary code.

11. The apparatus of claim 6, wherein the logic coupled to the one or more substrates includes transistor channel regions that are positioned within the one or more substrates.

12. A method comprising:
receiving compiled code;
identifying a plurality of blocks in the compiled code;
assigning a respective priority to each respective block of the blocks based on whether the respective block has a data usage that is dependent on an open data access;
generating instrumented code from the compiled code by modifying each respective block of the plurality of blocks, based on the respective priority assigned to the respective block, to include a register based probe or a memory based probe to measure a latency of the respective block during execution of the instrumented code on a graphics processor;
providing the instrumented code to the graphics processor;
determining instruction latencies from profiling data generated by the instrumented code; and
outputting the instruction latencies to be presented on a display.

13. The method of claim 12, wherein modifying each respective block of the blocks includes:

modifying the respective block to include the register based probe when the respective priority assigned to the respective block is greater than or equal to one or more other priorities of the priorities, and modifying the respective block to include the memory based probe when the respective priority of the respective block is less than the one or more other priorities.

14. The method of claim 12, further comprising determining a latency of each of the blocks during execution of the instrumented code by the graphics processor.

15. The method of claim 12, further comprising:
determining a static latency value for each of a plurality of instructions of one block of the blocks;
determining, with the register or memory based probe of the one block, an accumulated latency of the one block during execution of the instrumented code by the graphics processor; and
determining a dynamic latency value for a heavy instruction of the instructions of the one block, wherein
when a total sum of the static latency values is less than the accumulated latency, the dynamic latency value is determined based on the accumulated latency and each of the static latency values except the static latency value of the heavy instruction, and
when the total sum of the static latency values is greater than or equal to the accumulated latency, the dynamic latency value is determined based on the accumulated latency and each of the static latency values.

16. The method of claim 12, wherein the compiled code is binary code or an intermediate representation of binary code.

17. At least one non-transitory computer readable storage medium comprising a set of instructions, which when executed, cause a computing system to:
receive compiled code;
identify a plurality of blocks in the compiled code;
assign a respective priority to each respective block of the blocks based on whether the respective block has a data usage that is dependent on an open data access;
generate instrumented code from the compiled code by a modification of each respective block of the plurality of blocks, based on the respective priority assigned to the respective block, to include a register based probe or a memory based probe to measure a latency of the respective block during execution of the instrumented code on a graphics processor;
provide the instrumented code to the graphics processor;
determine instruction latencies from profiling data generated by the instrumented code; and
output the instruction latencies to be presented on a display.

18. The at least one non-transitory computer readable storage medium of claim 17, wherein to modify each respective block of the blocks of the compiled code, the set of instructions, which when executed, cause the computing system to:
modify the respective block to include the register based probe when the respective priority of the respective block is greater than or equal to one or more other priorities of the priorities, and
modify the respective block to include the memory based probe when the respective priority of the respective block is less than the one or more other priorities.

19. The at least one non-transitory computer readable storage medium of claim 17, wherein the instructions, when executed, cause the computing system to determine a latency of each of the blocks during execution of the instrumented code by the graphics processor.

20. The at least one non-transitory computer readable storage medium of claim 17, wherein the instructions, when executed, cause the computing system to:
determine a static latency value for each of a plurality of instructions of one block of the blocks;
determine, with the register or memory based probe of the one block, an accumulated latency of the one block during execution of the instrumented code by the graphics processor; and
determine a dynamic latency value for a heavy instruction of the instructions of the one block, wherein
when a total sum of the static latency values is less than the accumulated latency, the dynamic latency value is to be determined based on the accumulated latency and each of the static latency values except the static latency value of the heavy instruction, and
when the total sum of the static latency values is greater than or equal to the accumulated latency, the dynamic latency value is to be determined based on the accumulated latency and each of the static latency values.

21. The at least one non-transitory computer readable storage medium of claim 17, wherein the compiled code is binary code or an intermediate representation of binary code.

* * * * *